United States Patent Office 3,485,872
Patented Dec. 23, 1969

3,485,872
TRIFLUOROMETHYLANILIDE DERIVATIVES
Ikuzo Kageyama and Keiichi Maruo, Toyonaka-shi, Japan, assignors to Daikin Kogyo Company Limited, Osaka-shi, Japan
No Drawing. Original application Dec. 24, 1963, Ser. No. 333,198. Divided and this application Nov. 6, 1967, Ser. No. 704,195
Claims priority, application Japan, Jan. 9, 1963, 38/884, 38/64,208, 38/64,209
Int. Cl. C07c 103/30; A01n 9/20
U.S. Cl. 260—559   8 Claims

ABSTRACT OF THE DISCLOSURE

Trifluoromethylanilide derivatives of chlorophenoxyacetic acid having the formula:

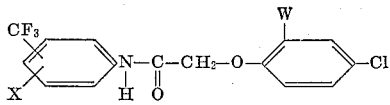

wherein $CF_3$ is positioned at the number 2 or 3 carbon atom of the aromatic ring to which it is attached, wherein X is a member selected from the group of chlorine, nitro and methoxy and being positioned at the number 4 or 6 carbon atom of the aromatic ring to which the member is attached, and wherein W is methyl or chlorine. The compounds are selectively herbicidal, being very effective against broad-leaf weeds but harmless against narrow leaf plants such as grass, rice, wheat etc.

---

This application is a division of application Ser. No. 333,198, filed Dec. 24, 1963, and now abandoned.

This invention relates to a novel series of trifluoromethylanilide derivatives derived from chlorophenoxyacetic acids.

One object of this invention is accordingly the provision of said trifluoromethylanilide derivatives of chlorophenoxyacetic acids, and more particularly trifluoromethylanilide derivatives derived from 2,4-dichlorophenoxyacetic acid and from 2-methyl-4-chlorophenoxyacetic acid.

Another object of the invention is the provision of a new series of herbicides having as a main effective ingredient at least one species of said trifluoromethylanilide derivatives.

A further object of the invention is the provision of selective herbicides effective against the weeds having broad-shaped leaves but harmless to the plants having linear-shaped or narrow-shaped blades.

A still further object of the invention is to provide herbicides having a substantially low toxicity on human and animal bodies and fishes.

A still another object of the invention is to provide herbicides having a lasting herbicidal efficacy.

Other objects and specific features of the invention will become apparent in view of the following:

The trifluoromethylanilide derivatives of chlorophenoxyacetic acids pertaining to the present invention are all novel compounds having the following formula:

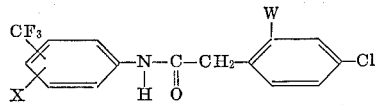

The trifluoromethylanilide derivatives of the aforesaid formula can be synthesized in accordance with various methods, so that the following methods employed in the invention are illustrative only and not restrictive of the scope and intent of the same.

According to the principles of this invention, trifluoromethylanilide derivatives of 2,4-dichlorophenoxyacetic acid are synthesized by reacting in a solvent, such as acetone, benzene, chloroform, tetrahydrofuren or the like, a 2,4-dichlorophenoxyacetic acid halide with an aniline having a trifluoromethyl group or having a trifluoromethyl group, a halogen atom and a nitro and alkoxy group. The reaction is carried out at a temperature from 0° to 40° C. preferably from 0° to 5° C. to prevent hydrolysis of the 2,4-dichlorophenoxyacetic acid halide employed. There may be added a reagent for hydrochloric acceptor, such as pyridine or sodium carbonate, to promote the reaction. Said trifluoromethylanilide derivatives can also be synthesized by conventionally reacting 2,4-dichlorophenoxyacetic acid per se or its anhydride with said trifluoromethyl-substituted aniline.

The trifluoromethylanilide derivatives of 2-methyl-4-chlorophenoxyacetic acid, on the other hand, are synthesized in the invention by employing 2-methyl-4-chlorophenoxyacetic acid per se or its halide or its anhydride in the place of the 2,4-dichlorophenoxyacetic acid halide which is employed in the aforesaid reaction for producing trifluoromethylanilide derivatives of 2,4-dichlorophenoxyacetic acid.

To exemplify the trifluoromethylanilide derivatives of the present invention, there are:

| Structural Formula | M.P. in ° C. |
|---|---|
| ![] $CF_3$ and $Cl$ substituted, $Cl-\langle\rangle-NHC(O)-CH_2O-\langle\rangle-Cl$ | 162 |
| $CF_3$, $Cl-\langle\rangle-NHC(O)-CH_2O-\langle\rangle-Cl$ (isomer) | 155 |
| $CF_3$, $\langle\rangle-NHC(O)-CH_2O-\langle\rangle-Cl$, Cl | 210 |
| $CF_3$, $CH_3O-\langle\rangle-NHC(O)-CH_2O-\langle\rangle-Cl$ | 178 |
| $CF_3$, $CH_3O-\langle\rangle-NHC(O)-CH_2O-\langle\rangle-Cl$ (isomer) | 180 |
| $CF_3$, $O_2N-\langle\rangle-NHC(O)-CH_2O-\langle\rangle-Cl$ | 165 |
| $CF_3$, $\langle\rangle-NHC(O)-CH_2O-\langle\rangle-Cl$, $OCH_3$ | 183 |
| $Cl-\langle\rangle-NHC(O)-CH_2O-\langle\rangle(CH_3)-Cl$, $CF_3$ | 147–147.8 |
| $Cl-\langle\rangle-NHC(O)-CH_2O-\langle\rangle(CH_3)-Cl$, $CF_3$ | 155–156 |

| Structural Formula | M.P. in °C. |
|---|---|
| CF₃–C₆H₃(Cl)–NHC(O)–CH₂O–C₆H₃(CH₃)–Cl | 151–151.3 |
| O₂N–C₆H₃(CF₃)–NHC(O)–CH₂O–C₆H₃(CH₃)–Cl | 122.5–125 |
| H₃OO–C₆H₃(CF₃)–NHC(O)–CH₂O–C₆H₃(CH₃)–Cl | 151.5–158 |
| H₃OO–C₆H₃(CF₃)–NHC(O)–CH₂O–C₆H₃(CH₃)–Cl | 129–129.5 |
| CF₃–C₆H₃(OCH₃)–NHC(O)–CH₂O–C₆H₃(CH₃)–Cl | 140–140.5 |

The trifluoromethylanilide derivatives of the aforesaid formula, some of which are exemplified hereinbefore, are all novel compounds and obtained in a state of from white to yellow crystalline powder. Said compounds are insoluble or hardly soluble in water, petroleum and carbon tetrachloride, but soluble in an organic solvent, such as ether, alcohol, acetone, tetrahydrofuran, methylpyrrolidone, dimethylformamide and gamma-butyrolactone.

The trifluoromethylanilide derivatives of the present invention exhibit various marked herbicidal effects as will be described in the following:

The trifluoromethylanilide derivatives of the present invention, in the first place, produce a marked herbicidal selectivity. Namely, said derivatives are very effective as selective herbicides against the weeds having broad-shaped leaves but harmless to the plants having linear-shaped or narrow-shaped blades, such as rice, wheat and the like plants.

The trifluoromethylanilide derivatives of the present invention, in the second place, exhibit a very low toxicity on human and animal bodies and fishes as well. Despite known herbicidal effects, sodium salts or esters of 2,4-dichlorophenoxyacetic acid or 2-methyl-4-chlorophenoxyacetic acid or chloroanilides of 2-methyl-4-chlorophenoxyacetic acid, for instance, produce a relatively marked toxicity on fishes, whereas the toxicity of the trifluoromethylanilide derivatives of the present invention is less than one-half that of those herbicidal ingredients as specified above, particularly less than one-tenth that of chloroanilides of 2-methyl-4-chlorophenoxyacetic acid.

The trifluoromethylanilide derivatives of the present invention, in the third place, exhibit a marked lasting herbicidal efficiency. Only one application of any of said trifluoromethylanilide derivatives is effective enough to protect aforesaid plants from weeds throughout the year-long growing period. When applied, for instance, to rice plant fields during the first offshooting period, the fields are completely protected from the invasion of weeds until harvesting without intermediate weeding which is usually applied two or three times during the growing period of rice plants.

These effects as specified above are obtained with the trifluoromethylanilide derivatives of the present invention employed in the order of 50 to 150 grams per 10 ares.

The trifluoromethylenilide derivatives of the present invention, in the fourth place, produce almost a similar herbicidal effect in the areas, the atmospheric temperature of which is not higher than 20° C., to that secured in the areas of a higher atmospheric temperature. Consequently, said derivatives can be employed quite extensively almost irrespective of the atmospheric temperature of the fields to be protected.

The trifluoromethylanilide derivatives of the present invention can be prepared into various forms of preparation, such as dust, wettable powder, grains and concentrated solution. In accordance with the desired forms, there are employed one or more species of additives, such as clay, talc, kaolin, bentonite, calcite and the like inactive carriers; cationic, anionic and nonionic surface active agents, and conventional organic solvents and spreaders. To prepare a concentrated solution, for instance, any of the aforesaid trifluoromethylanilide derivatives is dissolved in an organic solvent and admixed with one or more suitable surface active agents.

The trifluoromethylanilide derivatives of the present invention can be employed in a single or more species in admixture. Said derivatives can further be employed in admixture with any of agricultural and horticultural chemicals, such as insecticides, miticide, germicides and conventional herbicides other than the aforesaid trifluoromethylanilide derivatives. Fertilizers can also be used with said trifluoromethylanilide derivatives of the instant invention.

Preferred examples of this invention are as follows which are illustrative only and in which all parts are by weight:

EXAMPLE 1

There were dissolved in a flask 16.1 grams of 3-trifluoromethylaniline in 150 milliliters of acetone. To the resultant solution were added with stirring 24 grams of 2,4-dichlorophenoxyacetic acid chloride and 50 milliliters of 2 N-sodium carbonate aqueous solution, both agents being added simultaneously, dropwise and equivalently. The mixture was then allowed to react at 0° to 5° C. for 2 hours. After completion of reaction, the resultant mixture was poured in about 1 liter of ice water, and the precipitate crystallizing out were filtered, washed with water and dried, yielding 33 grams of crude crystals of M.P. from 153.5° to 154.5° C. when recrystallized with aqueous ethanol, there were obtained 25 grams of N-3-trifluoromethylphenylcarbamoyl - 2′,4′ - dichlorophenoxymethylene crystals of M.P. from 155° to 155.5° C.

*Analysis.*—Calcd.: F, 15.6%; Cl, 19.15%. Found F, 15.46%; Cl, 19.6%.

To 2 parts of said final product there were added 68 parts of clay and 30 parts diatomaceous earth. The mixture was ball milled and dusted in the order of 3 kg. per 10 ares to a rice plant field 15 days after transplanting of rice seedlings, completely protecting the field until harvesting without intermediate weeding from the growth of weeds, such as *Echinochlos crungelli* var. *praticole*, *Monochoria vaginalis* var. *plantagines*, *Eleoccharis scieuaris* var. *longiaste*, *Sogittaria trifolia* var. *angustifolia*, *Dopatrium junceum*, *Ancilema japonicum*, *Rotale indice* var. *ulginosa*, *Lindernia pyrideria*, *Eletine triandra* and the like. Ultimate yield of rice was equal to control.

EXAMPLE 2

There were reacted 20.7 grams of 3-trifluoromethyl-4-nitroaniline and 24 grams of 2,4-dichlorophenoxyacetic acid cholide in the same manner as described in Example 1, producing 31.5 grams of N-3-trifluoromethyl-4-nitrophenylcarbamoyl-2′,4′-dichlorophenoxy-methylene.

To 30 parts of said final product were added 20 parts of methylpyrrolidone, 25 parts of isopropanol and 25 parts of 1:10 molar condensation product of nonylphenol and ethylene oxide. The resultant homogenous solution was sprayed to golf links in the order of 1,000 grams in 150 liters of water per 10 ares, completely withering grown weeds 20 days after application, such as *Hydrocotyle sibthorpoides, Latua corniculatus* var. *japonicus, Pantago asiatica* var. *densiuncule, Terazacum platycarpum, Ixeris japonica, Euphorbia supina, Acaylpha eustralia, Hemistepis lyrat* and the like. The ground was protected from the further growth of weeds for 1 year after application, allowing the turf to grow thick without any hindrance.

EXAMPLE 3

There were reacted 11.9 grams of 3-trifluoromethyl-4-chlorophenylcarbomoyl - 2',4' - dichlorophenoxymethyl-acid chloride in the same manner as described in Example 1, producing 35.5 grams of N-3-trifluoromethyl-4-chlorophenylcarbamoyl - 2',4' - dichlorophenoxymethylene.

To 3 parts of the resultant product there were then added 60 parts of urea, 27 parts of clay and 10 parts of polyvinyl alcohol. The mixture was kneaded at 150° C., cooled, pulverized into from 0.1 to 3 millimeter grains with talc added while warm in small quantity, and applied by hand-spraying in the order of 3 kg per 10 ares to a field of 5 to 6 leaf-stage spring wheat, completely protecting the field until harvesting without any intermediate weeding from the growth of weeds, such as *Commelina communia, Polygonum longiaetua, Chanopodium cantrorubrum* and the like. Ultimate yield was equal to control.

EXAMPLE 4

There were dissolved in a flask 9.5 grams of 2-trifluoromethyl-4-chloraniline in 100 milliliters of acetone. To the resultant solution were added with stirring 11 grams of 2-methyl-4-chlorophenoxacetic acid chloride and 25 milliliters of 2 N-sodium carbonate aqueous solution, both agents being added simultaneously, dropwise and equivalently. The reaction was carried out for 2 hours at 0° to 5° C. After completion of reaction, the mixture was poured in 500 milliliters of ice water, and the precipitates crystallizing out were filtered, washed with water and dried, yielding 11.5 grams of crude crystals of M.P. from 135° to 141° C. When recrystallized with aqueous ethanol, there were produced 8 grams of N-2-trifluoromethyl-4-chlorophenylcarbamoyl-2' - methyl-4' - chlorophenoxymethylene.

*Analysis.*—Calcd.: F, 15.05%; Cl, 18.76%. Found: F, 14.9%; Cl, 17.8%.

To 2 parts of the aforesaid product were then added 68 parts of clay and 30 parts of diatomaceous earth. The mixture was ballmilled and dusted to a rice plant field in the order of 3 kg. per 10 ares 15 days after transplanting of seedlings, completely protecting the field until harvesting without intermediate weeding from the invasion of weeds as specified in Example 1. Ultimate yield of rice was equal to control.

EXAMPLE 5

There were reacted 11 grams of 2-methyl-4-chlorophenoxyacetic acid chloride and 16.2 grams of 3-trifluoromethylaniline in the same manner as described in Example 4, producing 7 grams of N-3-trifluoromethylphenylcarbamoyl-2' - methyl-4'-chlorophenoxymethylene.

*Analysis.*—Calcd.: F, 16.66%; Cl, 10.33%. Found: F, 15.7%; Cl, 10.4%.

To 30 parts of said final product there were added 30 parts of methylpyrrolidone, 15 parts if isopropanol and 25 parts of 1:10 condensation product of nonylphenol and ethylene oxide, and the resultant homogeneous solution was sprayed to a field of hemp plants, 5 cm. tall in the order of 200 grams in 100 liters of water per 10 ares, completely protecting the field until harvesting without intermediate weeding from weeds, such as *Chenopodiua centrorubrum, Commelina communis, Stellaria madia, Polygonua longisetua* and the like. Ultimate yield of hemp was equal to control.

EXAMPLE 6

There were reacted 11 grams of 2-methyl-4-chlorophenoxyacetic acid chloride and 9.8 grams of 3-trifluoromethyl-4-chloroaniline in the same manner as described in Example 4, producing 16 grams of N-3-trifluoromethyl-4-chlorophenylcarbamoyl - 2' - methyl-4'-chlorophenoxymethylene.

*Analysis.*—Calcd.: F, 15.05%; Cl, 18.76%, Found: F, 14.5%; Cl, 17.7%.

To 3 parts of said final product there were added 50 parts of urea, 37 parts of clay and 10 parts of polyvinyl alcohol. The mixture was kneaded at 150° C., cooled, pulverized into from 0.1 to 5 cm. grains with talc added while warm, and applied by hand-spraying in the order of 3 kg. per 10 ares to a corn field after seeding, completely protecting the field from the growth of weeds until harvesting. Ultimate yield was equal to control.

What we claim is:

1. A trifluoromethylanilide derivative of chlorophenoxyacetic acid having the formula:

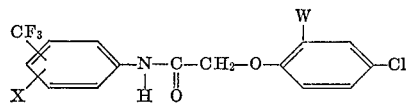

2. A compound according to claim 1 wherein W is chlorine.

3. A compound according to claim 2 wherein X is chlorine.

4. A compound according to claim 3 wherein the $CF_3$ radical is at the 3 position.

5. A compound according to claim 1 wherein X is chlorine.

6. A compound according to claim 5 wherein W is methyl.

7. A compound according to claim 1 wherein X is nitro.

8. A compound according to claim 1 wherein X is methoxy.

References Cited

Thompson et al., Botanical Gazette, vol. 107, pages 476–83, 493–96, 506 (1946).

HENRY R. JILES, Primary Examiner

H. I. MOATZ, Assistant Examiner

U.S. Cl. X.R.

71—118